(No Model.)
R. G. S. AUSTIN.
Cotton Cultivator.
No. 236,970. Patented Jan. 25, 1881.
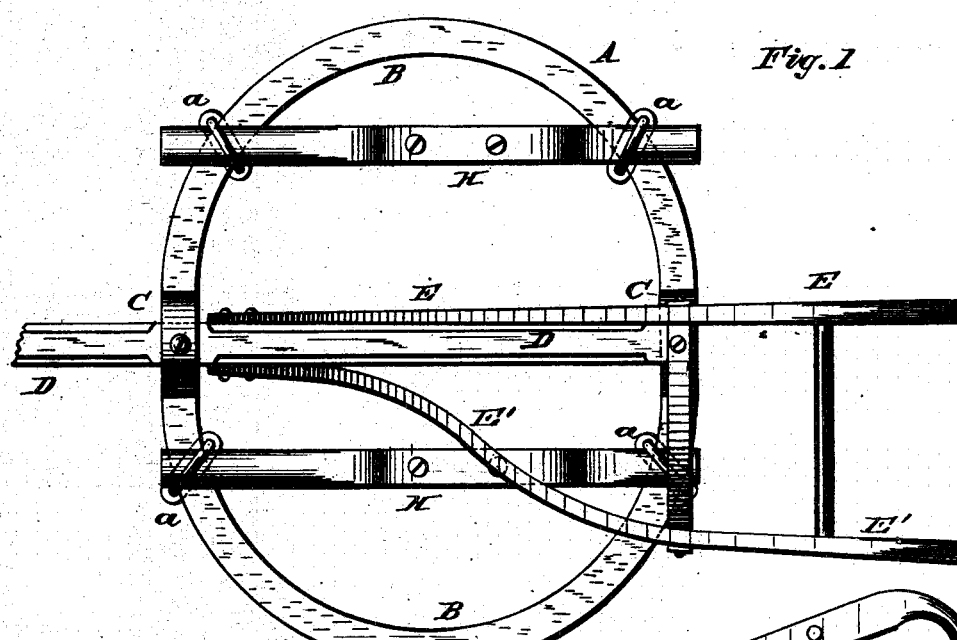

UNITED STATES PATENT OFFICE.

RICHARD G. S. AUSTIN, OF PINE BLUFF, ARKANSAS.

COTTON-CULTIVATOR.

SPECIFICATION forming part of Letters Patent No. 236,970, dated January 25, 1881.

Application filed August 17, 1880. (No model.)

*To all whom it may concern:*

Be it known that I, RICHARD G. S. AUSTIN, of Pine Bluff, in the county of Jefferson and State of Arkansas, have invented certain new and useful Improvements in Cotton-Cultivators; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention relates to certain improvements in cotton-cultivators, being designed as an improvement upon Patent No. 228,853, granted to me June 15, 1880; and it consists in the construction and arrangement of parts, as will hereinafter be more fully set forth, and pointed out by the claim.

In the annexed drawings, Figure 1 is a plan view. Fig. 2 is a side elevation, and Fig. 3 is a detail.

A represents the frame, which is composed of the semicircular wings B B and the arches C, said wings and arches being made of any suitable material and in one piece.

To the arches C is attached the beam D, which may be of any ordinary or desired construction, and secured to said arches in any suitable manner.

E E' represent the handles, which are secured to the beam D by any suitable means. The handle E stands rearward of the beam in a line therewith, and the handle E' is curved in the form shown. By this arrangement the operator is not compelled to straddle the row, as heretofore, but may walk to one side in the furrow.

F are the standards, of the form shown, and adapted to receive a suitable cultivator-tooth, G. To the top of these standards are secured short beams H, having tapering ends, which ends rest upon the upper portion of the semicircular wings and are held thereon by clips $a$. By this arrangement the distance between the teeth or shovels may be varied by adjusting the beams upon the semicircular wings and securing the same by the clips. The standards may also be adjusted to any desired angle in a like manner, thus adapting the device to all kinds of cotton under process of cultivation, and rendering the use of cultivators of different angle of tooth and width between the same unnecessary. It also strengthens the cultivator, and by its simplicity renders it less liable to get out of repair.

Having thus fully described my invention, what I claim as new, and desire to secure by Letters Patent, is—

The combination, with the frame A, composed of semicircular wings B and arches C, made in one piece, of the beam D, handles E E', and the short beams H, carrying standards F, having teeth G, and adjustably secured to said frame by the clips $a$, substantially as described.

In testimony that I claim the foregoing as my own I have hereto affixed my signature in presence of two witnesses.

R. G. S. AUSTIN.

Witnesses:
M. A. AUSTIN,
C. H. OWENS.